(12) United States Patent
Deschutter et al.

(10) Patent No.: US 7,545,486 B1
(45) Date of Patent: Jun. 9, 2009

(54) APPARATUS AND METHOD FOR DETERMINING THE CLOSING VELOCITY OF A VEHICLE DOOR

(75) Inventors: Tony J. Deschutter, St. Clair Shores, MI (US); Nidamaluri S. Nagesh, Ann Arbor, MI (US); Craig A. Rodriguez, Rochester Hills, MI (US); Timothy Patrick Mahoney, Birmingham, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 12/036,021

(22) Filed: Feb. 22, 2008

(51) Int. Cl.
*G01P 3/36* (2006.01)
(52) U.S. Cl. ........................ 356/28; 356/28.5
(58) Field of Classification Search ....... 356/3.01–3.15, 356/4.01–4.1, 5.01–5.15, 6–22
See application file for complete search history.

(56) References Cited

U.S. PATENT DOCUMENTS 4,155,555 A * 5/1979 Fink ........................... 473/221
6,062,079 A * 5/2000 Stewart ........................ 73/488
6,907,360 B2 * 6/2005 Gabiniewicz et al. ......... 702/41
2005/0088524 A1 * 4/2005 Bleckley et al. ........... 348/207.1

* cited by examiner

*Primary Examiner*—Thomas H Tarcza
*Assistant Examiner*—Luke D Ratcliffe
(74) *Attorney, Agent, or Firm*—Ingrassia, Fisher & Lorenz, P.C.

(57) ABSTRACT

An apparatus for measuring a closing velocity of a vehicle door includes a housing, first and second sensors, and a processor. The first sensor is coupled to the housing, has a first detection field, and is configured to generate a first signal when the vehicle door passes through the first detection field. The second sensor is coupled to the housing, has a second detection field, and is configured to generate a second signal when the vehicle door passes through the second detection field. The processor is in operable communication with the first and second sensors and is configured to receive the first and second signals and measure a time period between the receiving of the first and second signals.

15 Claims, 5 Drawing Sheets

APPARATUS AND METHOD FOR DETERMINING THE CLOSING VELOCITY OF A VEHICLE DOOR

TECHNICAL FIELD

Embodiments of the present invention generally relate to automobile testing equipment, and more particularly relate to instruments for determining the closing velocity of automobile doors.

BACKGROUND

In recent years, advances in technology, as well as ever-evolving tastes in style, have led to substantial changes in the design of automobiles. Many of the changes involve the variety, complexity, and quality of the luxury and convenience features now found as standard equipment on many automobiles.

Some of the most frequently used features on automobiles are the doors which allow occupants access to the automobile's cabin. Consumers have come to expect a particular feel of the operation of the doors, including the force required to close (and open) the doors. In particular, consumers expect the doors to close completely with only a moderate amount of force (or closing velocity). As such, manufacturers often test the force, or velocity, required to completely close the doors (i.e., "door-closing velocity") on the assembly line using large, automated machinery. However, there is often a need to test the minimum velocity required to close the doors after the automobile has left the manufacturing plant, such as when a salesperson or consumer suspects that the door is not closing (or opening) properly.

Accordingly, it is desirable to develop a portable or hand-held device for measuring the minimum velocity required to close the doors on an automobile. In addition, it is desirable that the device be lightweight, robust, easy to use, and relatively inexpensive. Furthermore, other desirable features and characteristics of the portable door-closing velocity measuring tool will become apparent from the subsequent detailed description and the appended claims, taken in conjunction with the accompanying drawings and the foregoing technical field and background.

BRIEF SUMMARY

In one embodiment, an apparatus for measuring a closing velocity of a vehicle door is provided. The apparatus includes a housing, first and second sensors, and a processor. The first sensor is coupled to the housing, has a first detection field, and is configured to generate a first signal when the vehicle door passes through the first detection field. The second sensor is coupled to the housing, has a second detection field, and is configured to generate a second signal when the vehicle door passes through the second detection field. The processor is in operable communication with the first and second sensors and is configured to receive the first and second signals and measure a time period between the receiving of the first and second signals.

In another embodiment, an apparatus for measuring a closing velocity of a vehicle door is provided. The apparatus includes a housing, an attachment mechanism, first and second sensors, and a processor. The attachment mechanism is configured to removably attach the housing to a body of the vehicle. The first sensor is coupled to the housing, has a first detection field, and is configured to generate a first signal when the vehicle door passes through the first detection field. The second sensor is coupled to the housing, has a second detection field, and is configured to generate a second signal when the vehicle door passes through the second detection field. The second detection field is offset from the first detection field by a distance. The processor is in operable communication with the first and second sensors and is configured to receive the first and second signals, measure a time period between the receiving of the first and second signals, and determine the closing velocity of the vehicle door based on the time period.

In a further embodiment, a method for measuring a closing velocity of a vehicle door is provided. First and second sensors, having respective first and second fields of detection, are removably attached to a body of the vehicle such that the vehicle door passes through the first and second fields of detection while the door is closing. First and second signals generated by the respective first and second sensors when the door passes through the respective first and second fields of detection are received. A time period between the receiving of the first and second signals is measured. The closing velocity of the door is determined based on the time period.

BRIEF DESCRIPTION OF THE DRAWINGS

The present invention will hereinafter be described in conjunction with the following drawing figures, wherein like numerals denote like elements.

DETAILED DESCRIPTION

Figure 1:
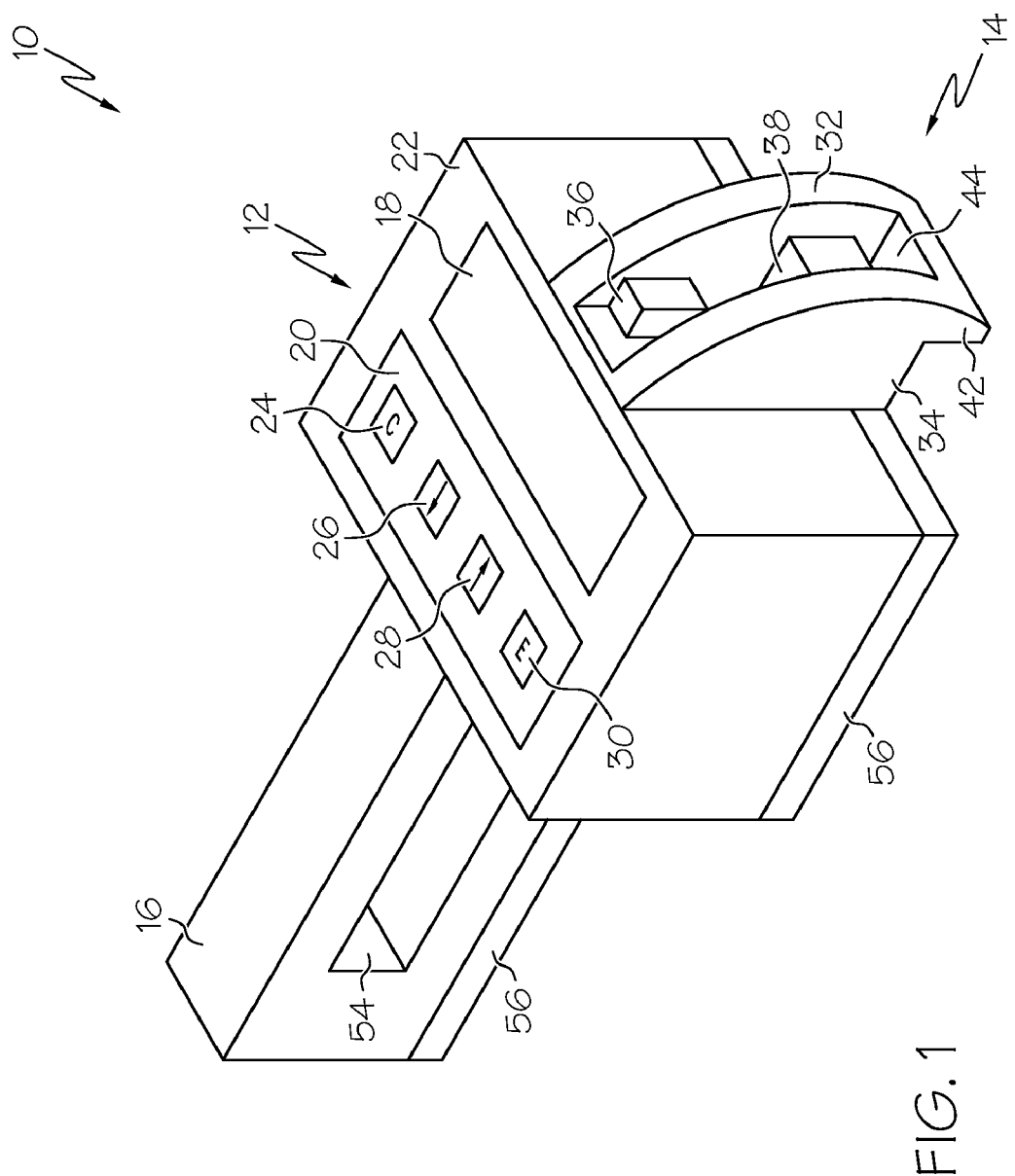
FIG. 1 is an isometric view of a door-closing velocity measuring device according to one embodiment of the present invention.

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

The following description refers to elements or features being "connected" or "coupled" together. As used herein, "connected" may refer to one element/feature being directly joined to (or directly communicating with) another element/feature, and not necessarily mechanically. Likewise, "coupled" may refer to one element/feature being directly or indirectly joined to (or directly or indirectly communicating with) another element/feature, and not necessarily mechanically. However, it should be understood that although two elements may be described below, in one embodiment, as being "connected," in alternative embodiments similar elements may be "coupled," and vice versa. Thus, although the schematic diagrams shown herein depict example arrangements of elements, additional intervening elements, devices, features, or components may be present in an actual embodiment. It should also be understood that FIGS. 1-5 are merely illustrative and may not be drawn to scale.

The force required to close a vehicle door (i.e., "door-closing force") varies based on a variety of factors such as door weight, hinge type, door size (i.e., dimensions), and location of door handle with respect to the pivot point of the hinge (i.e., when the handle is farther away, leverage is increased and the force required is reduced). Door-closing velocity (or speed), or the closing velocity of the door, may be more easily measured than force. The door-closing force may then be derived from the velocity measurement if necessary.

Further, a manufacturer of a wide range of vehicular products may chose to limit the variables that may play a significant role in determining the door-closing velocity (which correlates to door-closing force) by standardization. Despite the variation of door design by vehicle brand, design, or type, many of these vehicles may have doors with the same, or very similar, door-closing variables. As a result, a range of as few, for example, six standards for door-closing velocity may be sufficient to cover a wide range of vehicle brands and/or vehicle types. Accordingly, it may be convenient for an exemplary embodiment of a door-closing velocity measurement device to be configured for all or at least most of the range of door-closing standards of the manufacturer's product lines.

FIGS. 1-5 illustrate an apparatus (or device) for measuring a closing velocity of a vehicle door is provided. The apparatus includes a housing, first and second sensors, and a processor. The first sensor is coupled to the housing, has a first detection field, and is configured to generate a first signal when the vehicle door passes through the first detection field. The second sensor is coupled to the housing, has a second detection field, and is configured to generate a second signal when the vehicle door passes through the second detection field. The processor is in operable communication with the first and second sensors and is configured to receive the first and second signals and measure a time period between the receiving of the first and second signals.

FIG. 1 illustrates a portable door-closing velocity measuring device 10, according to one embodiment of the present invention. The device 10 includes a housing 12, a sensor assembly 14, and a handle 16. The housing 12 is substantially rectangular in shape and includes a display device 18 and a user input interface 20 on a top side 22 thereof.

The display device 18 is, for example, a liquid crystal display (LCD) device, as is commonly understood, and the user input interface 20 includes buttons (or keys) 24, 26, 28, and 30. In the depicted embodiment, button 24 is a "clear" button that clears the display device 18, buttons 26 and 28 are "scroll up" and "scroll down" buttons, respectively, to scroll or navigate through a menu displayed on the display device 18, and button 30 is a "selection" button to select an item from the menu.

Figure 2:
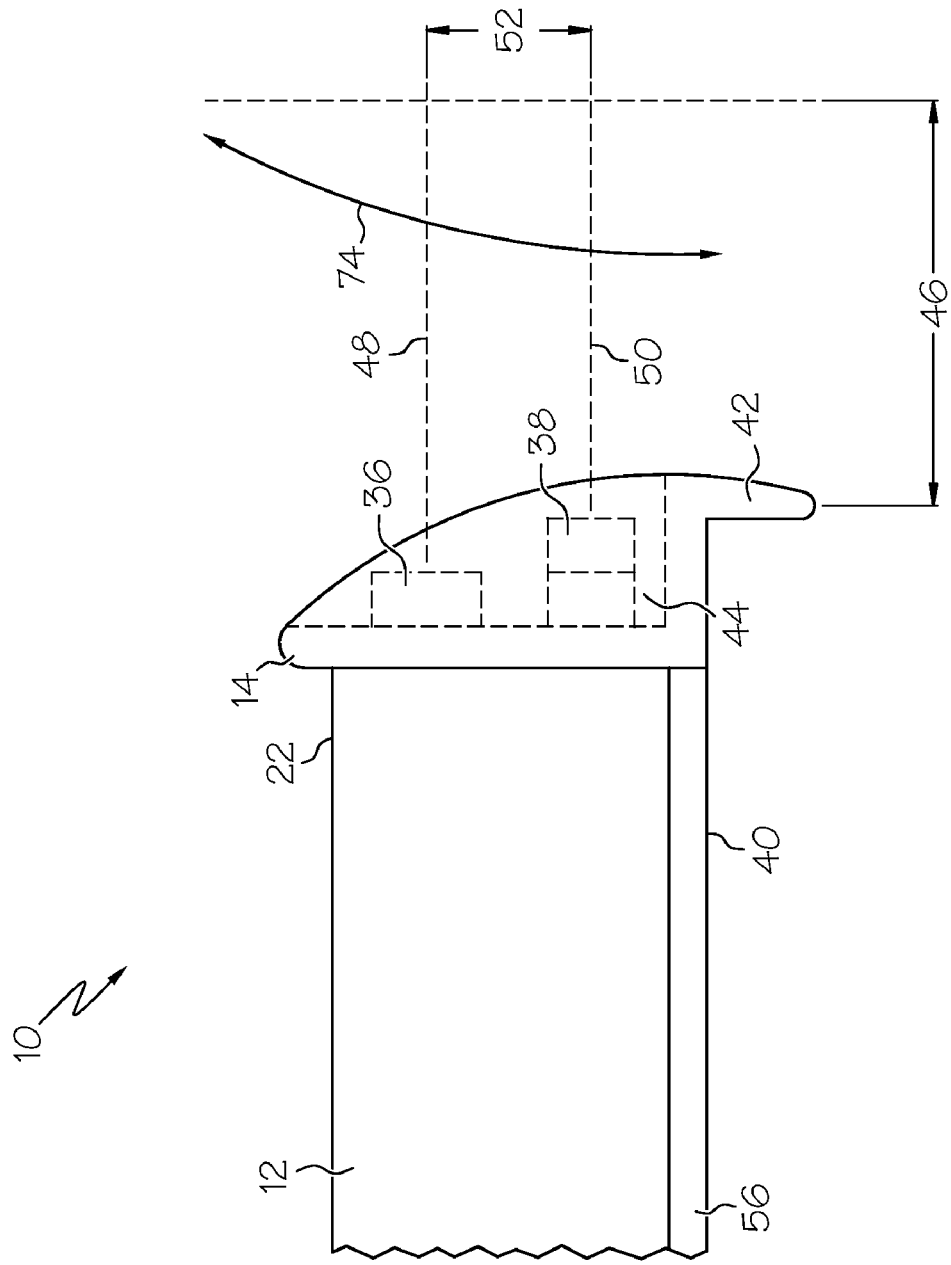
FIG. 2 is a side view of a housing and a sensor assembly on the device of FIG. 1.

Referring to FIGS. 1 and 2, the sensor assembly 14 is on a side of the housing 12 opposite the user input interface 20 and includes first and second alignment members (or claw sections) 32 and 34 and first and second sensor devices (or sensors) 36 and 38. The first and second alignment members 32 and 34 are elongate members connected to the housing 12 that have heights greater than a thickness of the housing 12. Referring particularly to FIG. 2, the first and second alignment members 32 and 34 each have a tapered alignment (or claw) tip 42 that extends beyond a bottom side 40 of the housing 12. As shown in FIG. 1, the majority of the first and second alignment members 32 and 34 are spaced such that a sensor slot 44 is formed between, while the alignments tips 42 of the members 32 and 34 are interconnected.

The first and second sensors 36 and 38 are located within the sensor slot 44, with the first sensor 36 being located "above" (i.e., closer to the top side 22 of the housing 12) the second sensor 38. In one embodiment, the first and second sensors 36 and 38 are infra-red sensors having infrared emitters that emit convergent beams of infrared light that are configured to focus within a focal distance 46 (e.g., 30 mm) of the device 10. The first and second sensors 36 and 38 are arranged such that the respective fields of detection (or more particularly, the central axes of the fields of detection) 48 and 50 are substantially parallel and separated by a measurement distance 52 ($d$) (e.g., 30 mm).

As shown in FIG. 1, the handle 16 is an elongate member connected to the housing 12 on a side opposite the sensor assembly 14. The handle 16 has a grip opening 54 extending therethrough to facilitate the handle 16 being grasped by a human hand. The device 10 also includes an arrangement of magnets 56 attached to the bottom side 40 of the housing 12 that, in the depicted embodiment, also extend beneath the handle 16.

Figure 3:
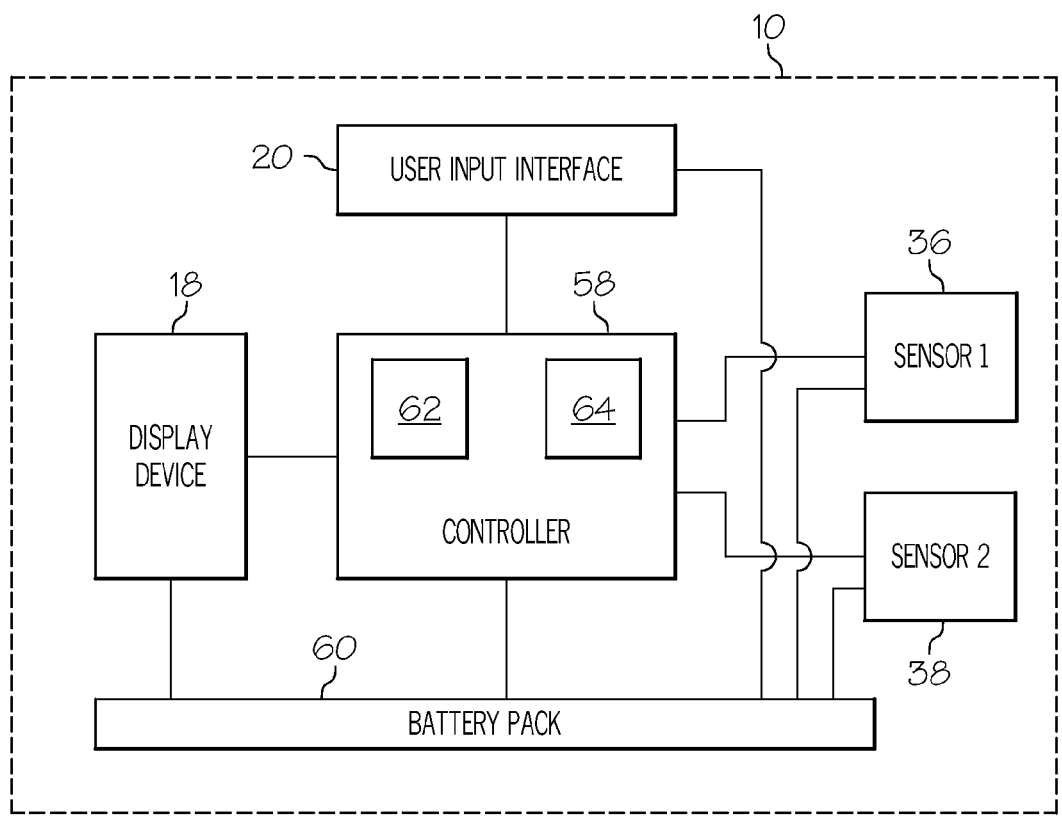
FIG. 3 is a schematic view of the device of FIG. 1.

FIG. 3 schematically illustrates the device 10 of FIGS. 1 and 2. As shown, the device 10 further includes a controller (or control system) 58 and a battery pack 60, both of which are in operable communication with the display device 18, the user input interface 20, and the first and second sensors 36 and 38. Although not specifically shown, the controller 58 and the battery pack 60 may be housed within the housing 12. The controller 58 includes a processor 62 and a memory 64 which may be in the form of integrated circuits formed on semiconductor substrates, as is commonly understood. The processor 62 may be any one of numerous known general-purpose microprocessors or an application specific processor that operates in response to program instructions stored on a compute-readable medium (i.e., memory 64). The memory 64 may include random access memory (RAM) and/or read only memory (ROM).

The controller 58 (and/or the processor 62) may have a clock that runs continuously such that a signal from the first sensor sets the first time (i.e., "start time") and the signal from the second sensor sets the second time (i.e., "stop time"), as is described below. Alternatively, the controller 58 may have a timer (or "stop watch") feature such that a signal from the first sensor starts the stop watch and sets the first time and the signal from the second sensor stops the watch and sets the second time.

Figure 4:
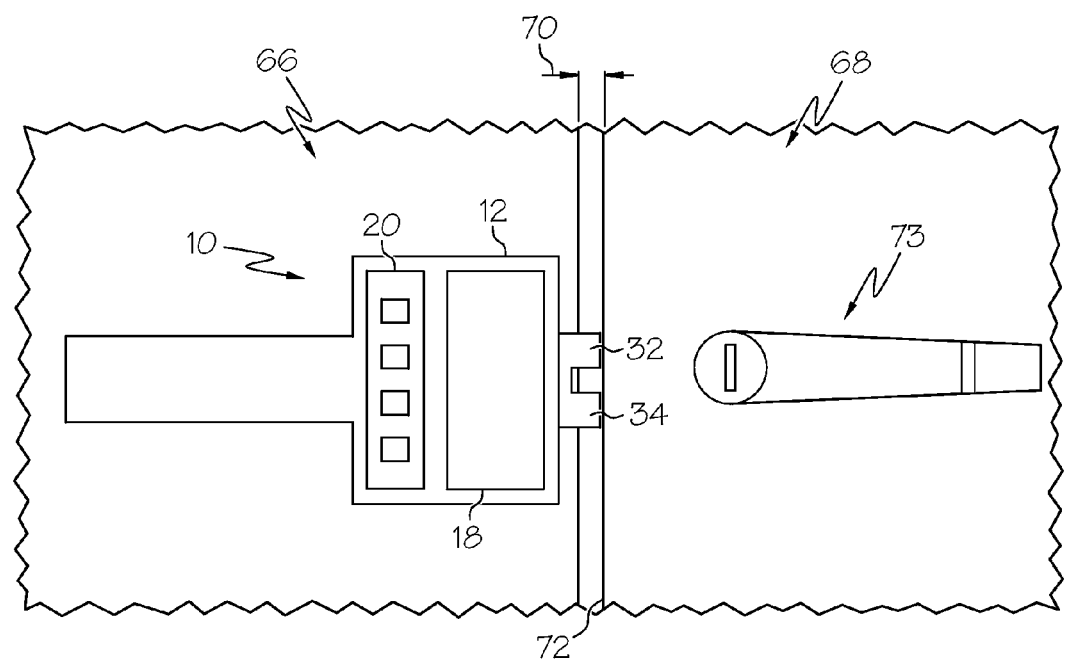
FIG. 4 is a plan view of the device of FIG. 1 attached to a vehicle.

During operation, referring to FIG. 4, the device 10 is removably installed on a vehicle body 66 adjacent to a vehicle door 68 to be tested via the magnets 56 (FIG. 1) on the bottom of the device 10. As shown, when properly installed on the vehicle body 66, the alignment tips 42 (FIG. 2) on the alignment members 32 and 34 extend into, or mate with, a gap (or depression) 70 that lies between the vehicle body 66 and an edge 72 of the vehicle door 68. Although not specifically shown, the vehicle door 68 is connected to the vehicle body 66 via a set of hinges located adjacent a side of the door opposite the edge 72, the gap 70, and a handle 73 of the door 68. As such, the vehicle door 68 hinges open such that the edge 72 of the door travels along an arc 74 shown in FIG. 2. It should be noted that in the depicted embodiment, at the points at which the arc 74 intersects the fields of detection 48 and 50 of the sensors 36 and 36, the arc is within the focal distance 46 of the sensors 36 and 38. As will be appreciated by one skilled in the art, the sensors 36 and 38 detect when their respective light beams are interrupted, or reflected, by an object, such as the vehicle door 68, passing within the focal distance 46 and generate electrical signals of such interruption Referring to FIGS. 2-4, the controller 58 receives the signals from the sensors 36 and 38 and measures a time period between the signals. The controller uses the measured time period to determine a door-closing velocity, as explained in greater detail below. The controller 58 also communicates with the display device 18, on which the calculated door-closing velocity is displayed. The controller 58 further receives input from the user input interface 20, which may include, for example, a series of key strokes for inputting data or for selecting particular settings from a menu displayed on the display device 18. Items on the menu may include, for example, a selection of characteristics or standards (i.e., maximum allowable door-closing velocities) or vehicle types stored in memory 64 that a user may select depending on the particular vehicle door (e.g., make/model of vehicle) being tested.

Figure 5:
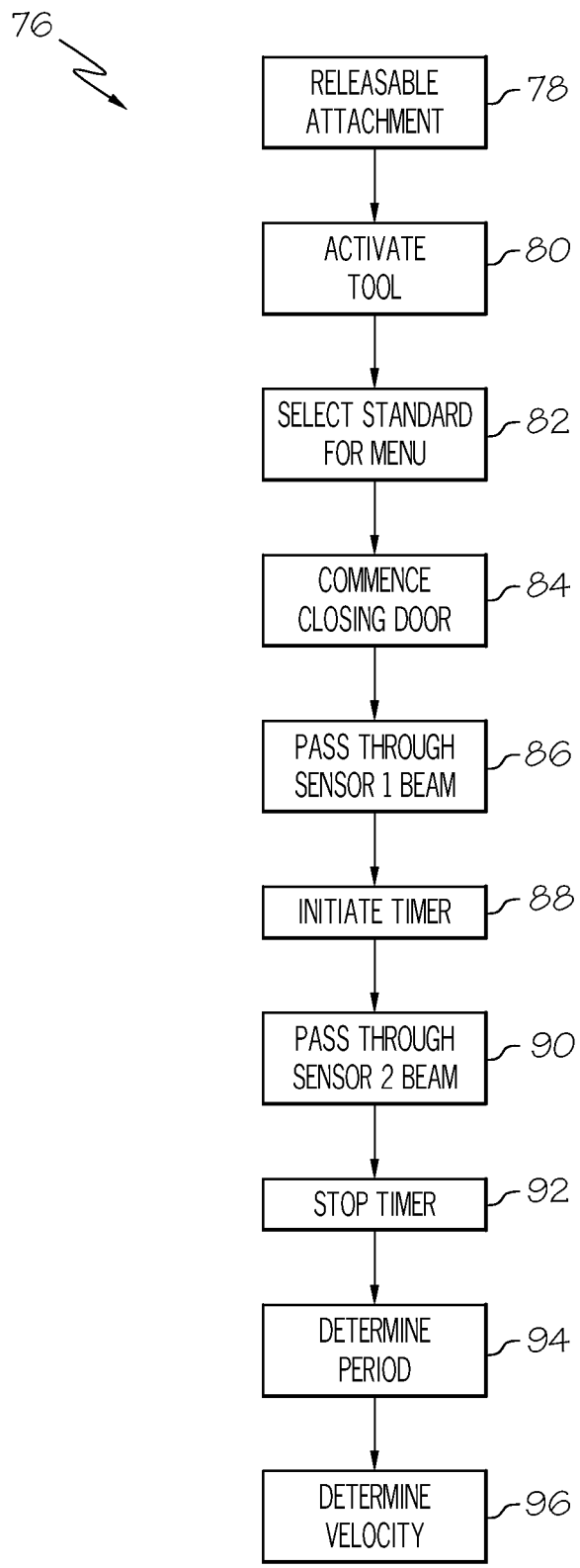
FIG. 5 is a flow chart illustrating a method of using the door-closing velocity measuring device of FIG. 1.

FIG. 5 illustrates a method 76 for testing the door-closing velocity of the vehicle door 68 shown in FIG. 4, according to one embodiment of the present invention. The method 76 commences in at step 78 when the portable door-closing velocity measuring device 10 is removably attached to the vehicle body 66, as shown in FIG. 4, with the alignment tips 42 of the alignment members 32 and 34 inserted into the gap 70. The device 10 is activated at step 80, which may occur prior to the device 10 being attached to the vehicle. At step 82, the appropriate characteristics of the door to be tested are selected, for example, from a menu displayed on the display device 18.

At step 84, door closing is commenced by, for example, manual application of a force sufficient to cause the door to swing closed. As the door 68 swings through the field of detection 48 of the first sensor 36 (FIG. 2), the first sensor 36 generates and sends a signal to the controller 58 (FIG. 3), which starts a timer, at steps 86 and 88, respectively. At step 90, as the edge 72 of the door 68 continues along the arc 74 (FIG. 2), it passes through the field of detection 50 of the second sensor 38, at which point the second sensor 38 generates and sends a signal to the controller 58 (FIG. 3). At steps 92 and 94, respectively, the timer is stopped, and the amount of time between the reception of the signals from the first and second sensors 36 and 38 is determined. Based on this time period (t) and the known measurement distance 52 (FIG. 2), at step 96, the controller 58 calculates a door-closing velocity (i.e., v=d/t) and displays its result on the display device 18. This measured door-closing velocity may be compared to a predetermined door-closing velocity standard for the particular door to determine whether the door-closing velocity standard is met. The processor 62 may also perform this comparison and display on the display device 18 if the closing velocity is less than or equal to the predetermined maximum for that particular door and/or vehicle type. The processor 62 may also correlate the door-closing velocity to force.

If the door did not completely close, the user may open the door and repeat the process while applying more force to the door to increase the velocity at which it closes.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the described embodiments in any way. Rather, the foregoing detailed description will provide those skilled in the art with a convenient road map for implementing the exemplary embodiment or exemplary embodiments. It should be understood that various changes can be made in the function and arrangement of elements without departing from the scope as set forth in the appended claims and the legal equivalents thereof.

What is claimed is:

1. An apparatus for measuring a closing velocity of a vehicle door comprising:
   a housing;
   a handle coupled to the housing;
   an attachment mechanism coupled to the housing and comprising at least one magnet, the attachment mechanism being configured to removably attach the housing to a body of the vehicle;
   at least one alignment member coupled to and extending from the housing, the at least one alignment member being shaped to mate with a depression on the vehicle;
   a first sensor coupled to the housing and having a first detection field, the first sensor configured to generate a first signal when the vehicle door passes through the first detection field;
   a second sensor coupled to the housing and having a second detection field, the second sensor configured to generate a second signal when the vehicle door passes through the second detection field; and
   a processor in operable communication with the first and second sensors and configured to:
      receive the first and second signals; and
      measure a time period between the receiving of the first and second signals,
   wherein the first and second sensors and the at least one alignment member are arranged such that when the housing is removably attached to the body of the vehicle with the at least one alignment member within the depression, the door passes through the first and second detection fields while the door is closing.

2. The apparatus of claim 1, wherein the processor is further configured to determine the closing velocity of the vehicle door based on the time period.

3. The apparatus of claim 2, wherein the first and second detection fields are offset by a distance and the determining of closing velocity of the vehicle door is further based on the distance.

4. The apparatus of claim 3, further comprising a memory coupled to the housing and in operable communication with the processor, the memory having data stored thereon that is associated with closing velocities for doors of a plurality of vehicles.

5. The apparatus of claim 4, further comprising:
   a display device coupled to the housing and in operable communication with the processor; and
   a user input interface coupled to the housing and in operable communication with the processor.

6. The apparatus of claim 1, wherein the first and second sensors comprise infrared sensors.

7. The apparatus of claim 1, further comprising a power supply coupled to the housing and electrically connected to the first and second sensors and the processor.

8. An apparatus for measuring a closing velocity of a vehicle door comprising:
   a housing;
   a handle coupled to the housing;
   an attachment mechanism configured to removably attach the housing to a body of the vehicle;
   at least one alignment member coupled to and extending from the housing, the at least one alignment member being shaped to mate with a depression on the vehicle and adjacent to the door;
   a first sensor coupled to the housing and having a first detection field, the first sensor configured to generate a first signal when the vehicle door passes through the first detection field;
   a second sensor coupled to the housing and having a second detection field, the second sensor configured to generate a second signal when the vehicle door passes through the second detection field, the second detection field being offset from the first detection field by a distance; and a processor in operable communication with the first and second sensors and configured to:
receive the first and second signals;
measure a time period between the receiving of the first and second signals; and
determine the closing velocity of the vehicle door based on the time period,
wherein the first and second sensors and the at least one alignment member are arranged such that when the housing is removably attached to the body of the vehicle with the at least one alignment member mated with the depression, the door passes through the first and second fields of detection while the door is closing.

9. The apparatus of claim 8, further comprising a memory coupled to the housing and in operable communication with the processor, the memory having a plurality of maximum allowable closing velocities stored thereon, each of the maximum allowable closing velocities being associated with a particular vehicle type.

10. The apparatus of claim 9, wherein the first and second sensors comprise infrared sensors and the attachment mechanism comprises at least one magnet.

11. A method for measuring a closing velocity of a vehicle door comprising:
removably attaching a housing having first and second sensors, with respective first and second fields of detection, and an alignment member coupled thereto to a body of the vehicle such that the alignment member mates with a depression on the vehicle and the vehicle door passes through the first and second fields of detection while the door is closing;
receiving first and second signals generated by the respective first and second sensors when the door passes through the respective first and second fields of detection;
measuring a time period between the receiving of the first and second signals; and
determining the closing velocity of the door based on the time period.

12. The method of claim 11, wherein the housing further comprises a handle.

13. The method of claim 12, wherein the measuring of the time period and the determining of the closing velocity are performed by a processor coupled to the housing.

14. The method of claim 13, further comprising displaying the closing velocity of the door to a user with a display device coupled to the housing.

15. The method of claim 14, wherein the removably attaching of the first and second sensors is performed with an attachment mechanism coupled to the housing.

* * * * *